United States Patent [19]
Kent et al.

[11] Patent Number: 6,098,569
[45] Date of Patent: Aug. 8, 2000

[54] ANIMAL LITTER, PROCESS FOR PREPARING ANIMAL LITTER, AND METHOD FOR REMOVAL OF ANIMAL WASTE

[75] Inventors: Gage A. Kent; Roger E. McPherson; Steven L. Ramsden; Leona E. Bishop; Frank J. Gute, all of Muscatine, Iowa

[73] Assignee: Grain Processing Corporation, Muscatine, Iowa

[21] Appl. No.: 09/352,445

[22] Filed: Jul. 13, 1999

Related U.S. Application Data

[63] Continuation of application No. PCT/US98/25262, Nov. 25, 1998.
[60] Provisional application No. 60/069,387, Dec. 12, 1997.

[51] Int. Cl.⁷ .................................................. A01K 29/00
[52] U.S. Cl. ............................................................. 119/171
[58] Field of Search .................................. 119/171, 172, 119/173

[56] References Cited

U.S. PATENT DOCUMENTS

| | | | |
|---|---|---|---|
| 3,059,615 | 10/1962 | Kuceski et al. | 119/1 |
| 3,747,564 | 7/1973 | Bickoff et al. | 119/171 |
| 3,921,581 | 11/1975 | Brewer | 119/173 |
| 4,007,708 | 2/1977 | Yacono | 119/1 |
| 4,009,684 | 3/1977 | Kliment et al. | 119/172 |
| 4,159,008 | 6/1979 | Bavaveas | 119/1 |
| 4,206,718 | 6/1980 | Brewer | 119/1 |
| 4,258,660 | 3/1981 | Pris et al. | 119/1 |
| 4,261,849 | 4/1981 | Benjaminson | 252/106 |
| 4,296,234 | 10/1981 | Mindt et al. | 536/47 |
| 4,315,761 | 2/1982 | Larrson et al. | 71/21 |
| 4,355,593 | 10/1982 | Stapley | 119/171 |
| 4,519,340 | 5/1985 | Dickey | 119/171 |
| 4,607,594 | 8/1986 | Thacker | 119/1 |
| 4,685,420 | 8/1987 | Stuart | 119/1 |
| 4,727,824 | 3/1988 | Ducharme et al. | 119/1 |
| 4,770,878 | 9/1988 | Thomas | 424/638 |
| 4,844,010 | 7/1989 | Ducharme et al. | 119/1 |
| 4,883,021 | 11/1989 | Ducharme et al. | 119/1 |
| 4,963,366 | 10/1990 | Thomas | 424/601 |
| 5,001,115 | 3/1991 | Sloan | 514/34 |
| 5,014,650 | 5/1991 | Sowle et al. | 119/171 |
| 5,062,954 | 11/1991 | Leedy et al. | 210/502.1 |
| 5,085,175 | 2/1992 | Clements, Jr. et al. | 119/171 |
| 5,094,189 | 3/1992 | Aylen et al. | 119/173 |
| 5,152,250 | 10/1992 | Loeb | 119/171 |
| 5,176,107 | 1/1993 | Buschur | 119/173 |
| 5,183,010 | 2/1993 | Raymond et al. | 119/172 |
| 5,188,064 | 2/1993 | House | 119/172 |
| 5,193,489 | 3/1993 | Hardin | 119/173 |
| 5,207,389 | 5/1993 | Hall et al. | 241/3 |
| 5,207,830 | 5/1993 | Cowan et al. | 106/672 |
| 5,209,185 | 5/1993 | Chikazawa | 119/171 |
| 5,215,041 | 6/1993 | Krahenbuhl | 119/172 |
| 5,216,980 | 6/1993 | Kiebke | 119/173 |
| 5,230,305 | 7/1993 | House | 119/171 |
| 5,329,880 | 7/1994 | Pattengill et al. | 119/171 |
| 5,339,769 | 8/1994 | Toth et al. | 119/173 |
| 5,352,780 | 10/1994 | Webb et al. | 536/56 |
| 5,358,607 | 10/1994 | Ellis | 162/100 |
| 5,361,719 | 11/1994 | Kiebke | 119/171 |
| 5,415,131 | 5/1995 | Dodman | 119/171 |
| 5,469,809 | 11/1995 | Coleman | 119/173 |
| 5,503,111 | 4/1996 | Hughes | 119/173 |
| 5,526,770 | 6/1996 | Kiebke | 119/171 |
| 5,526,771 | 6/1996 | Ito | 119/172 |
| 5,542,374 | 8/1996 | Palmer, Jr. | 119/173 |
| 5,605,114 | 2/1997 | Peltenburg et al. | 119/171 |
| 5,609,123 | 3/1997 | Luke et al. | 119/173 |
| 5,690,052 | 11/1997 | Sladek | 119/171 |
| 5,740,761 | 4/1998 | Lee et al. | 119/173 |
| 5,762,023 | 6/1998 | Carter | 119/173 |
| 5,878,696 | 3/1999 | Gerling et al. | 119/526 |

FOREIGN PATENT DOCUMENTS

0788736A1   8/1997   European Pat. Off. .

*Primary Examiner*—Peter M. Poon
*Assistant Examiner*—Yvonne R. Abbott
*Attorney, Agent, or Firm*—Leydig, Voit & Mayer, Ltd.

[57] ABSTRACT

A grain-based animal litter is disclosed. In accordance with the invention, the animal litter comprises discrete plural particles of a grain-based substrate, which particles tend to agglomerate into clumps when wetted. The litter of the invention absorbs liquids such as animal excretions, and substantially reduces the odor thereof. Preferably, the substrate is a grain germ; more preferably, the substrate is a corn germ; most preferably, the substrate is washed, spent grain germ. In accordance with a preferred embodiment of the invention, the grain germ is provided in the form of discrete plural granules, each of which granules includes a cohesiveness agent in an amount sufficient to enhance the cohesiveness of the granule.

77 Claims, No Drawings

ANIMAL LITTER, PROCESS FOR PREPARING ANIMAL LITTER, AND METHOD FOR REMOVAL OF ANIMAL WASTE

RELATED APPLICATION

This is a continuation of International Application No. PCT/US98/25262, filed Nov. 25, 1998, which designates the United States. This application further claims priority to prior Provisional Application Ser. No. 60/069,387 filed Dec. 12, 1997. Both previous applications are hereby incorporated by reference in their entireties.

TECHNICAL FIELD OF THE INVENTION

The present invention relates to a grain-based animal litter, and more particularly relates to an animal litter comprising discrete plural particles which tend to agglomerate upon wetting. The invention further relates to a process for preparing the animal litter, and to related products and processes.

BACKGROUND OF THE INVENTION

Clumping animal litters are those litters which are initially provided in the form of discrete plural particles, which particles tend to agglomerate into solid masses or clumps when wetted by a liquid such as animal urine. A number of such clumping litters have been provided in the prior art. One advantage of such clumping litters is that the solid clumps formed upon wetting of the litter can be separately removed as discrete entities from the remaining litter and can be discarded by the animal owner, leaving behind a quantity of relatively uncontaminated litter. Animal owners, and in particular owners of animals such as house cats, often find the clumping property of such litters to be convenient for periodic cleaning of the animal litterbox. Some known animal litters have good ammonia-masking properties. Because ammonia is a breakdown product of the urea found in animal urine, the ability of an animal litter to mask the odor of ammonia is a desired property.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters suffer from certain drawbacks. For example, one disadvantage of clay litters is the high density of the clay component of the litter. Because of this high density, a heavy mass of litter must be used for a given volume of urine. The resulting clumps of spent litter are somewhat heavy, and thus can fracture in the absence of strong interparticle adhesion. Another disadvantage of clay litters is that, because the clay is not biodegradable, the litter cannot be flushed into some sewerage systems after use. This may be inconvenient for certain animal owners.

In recognition of these drawbacks, the prior art also has provided animal litters made from biodegradable materials, such as seed hulls or other grain-based materials. Such litters are often suitable for disposal by flushing into sewerage systems. In recognition of the advantages inherent in clumping animal litters, the prior art has provided biodegradable litters that exhibit a clumping property. Like typical clumping clay litters, such litters often comprise discrete particles of a liquid-absorbent substrate having a liquid-activated adhesive coated thereon.

Conventional grain-based litters also suffer from a number of drawbacks. For example, spent clumps of such grain-based litters typically are less durable than clumps of clay-based litters. Moreover, conventional grain-based litters also often have a strong odor, which some people find objectionable, and which further may entice animals such as dogs to eat the litter. Moreover, while grain-based clumping litters may initially form cohesive clumps, the long-term cohesiveness of the formed clumps may be poor. Thus, while a solid clump may be formed and remain solid for a short period of time, the clump may tend to disintegrate with time or on handling, making it difficult to separate the spent clumped litter from the litterbox.

Another problem with both clay-based and grain-based clumping litters relates to clumping efficiency, or e amount of litter required to form a clump. Large amounts of conventional litters are required to form a clump, and thus conventional clumping litters are used up quickly. The animal owner thus is forced to replenish the supply of litter frequently.

In light of the drawbacks inherent in known clay-based and grain-based animal litters, there exists a need in the art for a more satisfactory biodegradable clumpable cat litter. Ideally, the litter should be made from a renewable, biodegradable resource, such as a grain-based substrate. The litter should not be edibly attractive to animals, should have a low odor, and should have excellent ammonia masking properties. The litter also should possess acceptable clumping properties, both with respect to initial and long-term cohesiveness of the clumps. It is a general object of the present invention to provide an animal litter that overcomes the drawbacks inherent in known clumping animal litters.

SUMMARY OF THE INVENTION

In accordance with the present invention, a clumping cat litter in the form of discrete plural particles of a grain-based substrate is provided. It has been found that grain germ, and particularly corn germ, is particularly suitable for use as a clumping cat litter. In accordance with a preferred embodiment of the invention, the animal litter comprises discrete plural particles of corn germ. In a particularly preferred embodiment of the invention, the litter comprises discrete plural granules, or compacted particles, of corn germ, which granules include a cohesiveness agent in an amount sufficient to enhance the cohesiveness of the granules. The litter may include other ingredients such as mold inhibitors. The invention further encompasses methods for preparing an animal litter and methods for removing animal waste.

In accordance with a highly preferred embodiment of the invention, the animal litter comprises discrete plural granules of washed, spent grain germ and a cohesiveness agent in an amount sufficient to enhance the cohesiveness of the granules. When a litter is made in accordance with the invention, the litter will exhibit an excellent clumping function, such that the granules of litter will agglomerate upon wetting. The clump or clumps formed upon agglomeration of the animal litter will be cohesive, and will remain cohesive for many hours to allow for later removal. Moreover, the litter will be substantially odorless, and will not be edibly attractive to animals such as dogs. The litter will have excellent ammonia-masking properties, and will have a high clumping efficiency.

Other features and embodiments of the invention are disclosed in the following description of the invention and appended claims.

DESCRIPTION OF THE INVENTION

The invention provides a clumping animal litter which agglomerates when wetted by a liquid, such as, for example, liquid animal excretions or liquid that is present in solid or semisolid animal excretions. In accordance with the invention, the litter is provided in the form of discrete plural particles of litter, at least a portion of which particles will agglomerate into at least one clump when wetted. By "agglomerate" is meant formation of a relatively cohesive interparticle consolidation of at least two particles. By "clump" is meant a relatively cohesive consolidated mass, or agglomeration, of two or more particles. It is contemplated that the clumps of animal litter formed in accordance with the invention will comprise an agglomeration of at least two particles, preferably at least about 200 particles, and more preferably at least about 2,000 particles, depending upon the volume of liquid applied.

The litter of the invention is prepared from a grain-based substrate, which substrate may comprise or be derived from any suitable grain. While grains such as wheat, corn, soy, sorghum, alfalfa, barley, and the like, are suitable for use in conjunction with the invention, the grain-based substrate preferably is a corn-based substrate. The substrate may be derived from any suitable part of the grain. Most preferably, the grain-based substrate is a grain germ and, in accordance with a highly preferred embodiment of the invention, the substrate is corn germ that is obtained in a wet or dry milling process. It has surprisingly been found that corn germ is especially effective in suppressing odors from animal waste and in providing other properties desired of an animal litter.

The grain germ preferably comprises spent germ, which is grain germ from which oil has been expelled, such as by pressing or hexane or other solvent extraction. Most preferably, the grain germ is expeller extracted, that is, the oil has been removed by pressing. Most preferably, the spent germ is substantially free of odor components. Surprisingly, it has been found that washing of the germ or other grain-based substrate prior to the incorporation of the germ in an animal litter will substantially remove odor components from the germ. More surprisingly, it has been found that by so removing the odor components, the washing of the germ or other substrate will render the litter more acceptable to cat owners and substantially edibly unattractive to animals such as dogs. It is further believed that washing of the grain germ or other substrate will reduce the level of flavor components in the grain-based substrate.

The litter of the invention is in the form of discrete plural particles. In accordance with a preferred embodiment of the invention, the particles are in the form of compressed or compacted particles, i.e., in the form of granules. By "granules" is meant particles that are compressed or compacted, such as by a pelletizing, extrusion, or similar compacting step. Such compression or compacting of the particles is preferred, inasmuch as the intraparticle cohesion of the particles will be enhanced by such compacting or compressing step. In the preferred embodiment of the invention, the granules are prepared by pelletizing the grain-based substrate in a pellet mill. The pellets prepared thereby are ground or crumbled to a granule size suitable for use as an animal litter. Preferably, the animal litter is in the form of granules having a granule size ranging from about 4 to about 400 mesh (USS); more preferably, about 8 to about 80 mesh; and most preferably about 14 to about 20 mesh. If the grain germ is spent via solvent extraction, use of a lubricity agent such as corn oil may be necessary in the pelletizer, but such a lubricity agent ordinarily is not necessary if the germ is expeller extracted. In other embodiments of the invention, the litter is prepared by other compacting or compressing processes such as, for example, by extrusion of the grain-based substrate through a die and grinding of the extrudate to a suitable granule size.

The granules of grain-based substrate may be sufficiently cohesive for use as an animal litter. Preferably, however, the granules include a cohesiveness agent to enhance the cohesiveness of the animal litter granules. In accordance with the invention, the cohesiveness agent is believed to provide additional hydroxyl groups, which enhance the bonding between grain proteins within the litter granule. It is further believed that the additional hydroxyl groups so function by enhancing the hydrogen bonding of proteins to starch and to other proteins. The cohesiveness agent may be present in any amount suitable to enhance the cohesiveness of the granules of animal litter.

In accordance with the invention, the cohesiveness agent preferably is a polysaccharide. Any suitable polysaccharide may be used in conjunction with the invention and thus, for example, the cohesiveness agent may comprise one or more polysaccharides such as dextrins, maltodextrins, starches, flours, cellulosics, hemicellulosics, and the like. Preferably, the cohesiveness agent comprises a starch, and most preferably, the cohesiveness agent comprises a corn starch.

Prior art litters employ modified, pre-gelatinized starches to effect adhesion between particles of litter, i.e., interparticle adhesion. The starch used in conjunction with the present invention is not used specifically for this purpose, but rather is employed to effect intraparticle cohesion. The clumping interparticle agglomeration of the animal litter of the invention is believed to result primarily as a result of the interaction of proteins or other components present by virtue of the grain-based substrate, and is not believed to result from adhesion forces generated through the use of starch. Surprisingly, it has been found that non-gelatinized, unmodified starches are especially suitable for use as cohesiveness agents in conjunction with the invention. When unmodified starches are employed, it is believed that such starches may contribute to a small extent to interparticle adhesion in the clumped litter.

The cohesiveness agent of the invention preferably further includes a supplemental cohesiveness agent. In accordance with the invention, the supplemental cohesiveness agent is an ionic species that is believed to enhance protein-protein and/or protein-starch interactions. Any suitable ionic salt may be used in conjunction with the invention. For example, in accordance with preferred embodiments of the invention, the supplemental cohesiveness agent is selected from among the alkali and alkaline-earth salts of common anions, such as the halide, nitrate, nitrite, carbonate, phosphate, sulfate, and bicarbonate salts, and the like. More preferably, the supplemental cohesiveness agent is selected from the group consisting of sodium chloride, calcium chloride, sodium carbonate, calcium carbonate, sodium bicarbonate and mixtures thereof. Even more preferably, the supplemental cohesiveness agent is selected from among sodium chloride, calcium carbonate, and mixtures thereof. Most preferably, the supplemental cohesiveness agent is sodium chloride. The supplemental cohesiveness agent may be present in any amount sufficient to assist the cohesiveness agent in enhancing the cohesion of the animal litter granules.

Because the animal litter of the invention is made from biodegradable materials, the litter is subject to spoilage, such as by molding. To prevent or inhibit such molding, the litter may include a mold inhibitor, which may be present in any amount sufficient to inhibit the molding of the animal litter. Any suitable mold inhibitor may be employed in conjunction with the invention. The mold inhibitor preferably is selected from among the propionate salts, and most preferably is selected from the group consisting of sodium propionate and calcium propionate.

The animal litter of the invention may comprise the grain-based substrate alone, or in conjunction with other ingredients. Preferably, the grain-based substrate is a washed grain-based substrate that is present in a dry basis amount of at least about 45% by weight of the animal litter (based on the total weight of the animal litter including moisture). More preferably, the grain-based substrate is present in an amount ranging from about 50% to about 85% by weight; even more an amount ranging from about 60% to about 75% by weight; and most preferably, about 67.5% by weight. The remaining dry components of the animal litter preferably include the cohesiveness agent, and, when used, a supplemental cohesiveness agent. The cohesiveness agent may be present in a dry basis amount ranging up to about 45% by weight of the animal litter; preferably, an amount ranging from about 3% to about 35% by weight; more preferably, an amount ranging from about 10% to about 25% by weight; and most preferably, inclusive of the supplemental cohesiveness agent, an amount of about 18% by weight, of which about 16.2% by weight comprises the cohesiveness agent.

The supplemental cohesiveness agent, when used, is preferably present in an amount of at least about 0.05% be weight, exclusive of the polysaccharide cohesiveness agent. More preferably, the supplemental cohesiveness agent is present in an amount ranging from about 0.05% to about 8% by weight; more preferably, about 0.1% to about 6% by weight; and most preferably, about 1.5% to about 4% by weight. When a mold inhibitor is employed, it preferably is present in an amount ranging from about 0.02% to about 3.5% by weight.

To maintain the cohesiveness and sorption capacity of the animal litter, the litter preferably has a moisture content sufficiently high to prevent the granules of animal litter from becoming friable and sufficiently low to allow additional moisture to be absorbed. Preferably, the moisture content is less than about 30%. More preferably, the moisture content ranges from about 5% to about 25%; even more preferably, the moisture content ranges from about 10% to about 20%; even more preferably, the moisture content ranges from about 12% to about 16%, and most preferably the moisture content is about 14.5%. It is contemplated that some of the moisture in the animal litter will be present originally in the grain-based substrate and/or cohesiveness agent.

In accordance with the invention, the animal litter will be effective in suppressing odors of animal waste. Animal urine contains urea, a compound which breaks down in animal litterboxes to form ammonia. The ammonia odor of animal litterboxes is often considered to be objectionable. Animal litters made in accordance with the preferred embodiments of the invention will be effective in masking ammonia odors, and a litterbox containing such litter will remain free from ammonia odors even after up to about 30 hours after an animal has excreted waste into the litter.

The litter of the invention preferably has a density sufficient to allow interparticle binding, yet that will minimize the weight of litter in a litterbox. In accordance with the invention, the litter preferably has a density ranging from about 15 to about 45 lbs./cu.ft. More preferably, the density of the cat litter of the invention ranges from about 25 to about 40 lbs./cu.ft.; and even more preferably, the density is in the range of from about 30 to about 35 lbs./cu.ft. Density preferably is evaluated after loosely filling a container and measuring the weight of a specific volume of the litter.

Because the animal litter of the invention is to be used to absorb animal waste, the litter should have a sorption capacity sufficient to allow the animal litter to so function. The sorption capacity of the preferred litters of the invention typically is at least about 0.04 ml water per gram of litter, and more typically ranges from about 0.04 to about 2.4 ml/g; more typically, the sorption capacity is from about 1.0 to about 1.4 ml/g. The sorption capacity is determined per gram of animal litter, and is based on the sorption of deionized water, as described in more detail hereinbelow. Preferred sorption capacity ranges are believed to approximate that of animal urine.

Other properties may be desired of an animal litter. For example, to minimize inconvenience and mess associated with packaging, transporting, and using the litter, the litter preferably generates a minimal amount of dust. The preferred litters of the present invention do not generate substantial dust. Another preferred property is clumping efficiency. Clumping efficiency is the amount of litter required to form a clump with a given volume of liquid, with lower amounts of required litter corresponding to higher clumping efficiencies. Preferably, to absorb 150 ml animal urine, less than about 120 g of litter is required; more preferably, less than about 110 g is required.

Other desired properties include biodegradability and tendency to remain clumped. Biodegradability is particularly desired when the animal owner wishes to dispose of clumps of litter by flushing them into the toilet. The litter of the invention is believed to be at least as biodegradable as hull-based materials, and thus the litter of the invention may be disposed of by flushing, even into a septic system. Tendency to remain clumped refers to the stability of the clump of clumped cat litter. A clumping litter should remain clumped for at least 48 hours after the clump has formed. The litters of the invention have an excellent tendency to remain clumped.

The invention is also directed towards a process for preparing an animal litter. In accordance with the invention, the process comprises the step of providing discrete plural particles of a grain-based substrate in a particle size suitable for use as an animal litter, as previously described. Preferably, the process includes a step of compacting or compressing the particles of animal litter into granules, which most preferably is accomplished in a pelletizing step. The mold inhibitor and cohesiveness agent, when used, can be added at any suitable time, and preferably are mixed with the grain-based substrate in the desired proportions prior to pelletizing of the grain-based substrate. Moisture content in the pellet mill feed preferably is in the ranges set forth above with respect to the moisture content in the finished product, and preferably is about 14–14.5%. Preferably, moisture is added to the feedstock in the form of liquid water to bring the feedstock to this moisture content. The temperature in the pellet mill preferably is brought to about 82° C. with steam. The pellet mill may be operated under any conditions that impart sufficient work to the feedstock to provide pellets. In one preferred embodiment, the pellet mill is operated with a ⅛ in.×2 in. die at 100 lb./min. pressure at 82° C. to provide pellets, which then are crumbled in a pellet mill crumbler to provide discrete plural particles having a particle size capable of passing through an 8 mesh screen but being retained on a 20 mesh screen.

The process of the invention preferably further includes a step of washing the grain based substrate to substantially remove odor components therefrom. Any suitable washing step can be employed in conjunction with the invention. For example, in accordance with preferred embodiments of the invention, the washing is countercurrent washing. Any suitable washing solvent, such as an aqueous solvent, may be employed in conjunction with the invention. Preferably, the washing solvent is selected from among methanol, ethanol, hydrogen peroxide, water, and mixtures thereof; most preferably, the washing solvent is water.

Also encompassed by the invention is a method for the removal of animal waste. In accordance with the invention, the method comprises the steps of providing a container including the animal litter, allowing the animal to excrete waste into the container, whereby the litter agglomerates into at least one clump, and removing the clump and any solid waste leaving behind substantially unspoiled litter. By "container" is meant any enclosed or partially enclosed area, such as a litterbox, a cage, a stall, a pen, or the like. The method is contemplated to be useful for any animals, such as cats, dogs, mice, birds, gerbils, and other animals and finds particular applicability in connection with removal of waste from house cats.

The following examples demonstrate various embodiments of the invention, but should not be construed as limiting the invention in scope.

SYNTHETIC ANIMAL URINE

To de-ionized water, 8.60 g of calcium chloride dihydrate ($CaCl_2 \cdot 2H_2O$), 100.80 g of urea ($NH_2CONH_2$), and 4.20 ml of a 28% (wt./wt.) aqueous solution of ammonium hydroxide ($NH_4OH$) are added. The entire solution is brought to one liter total volume. The pH of the resulting solution is adjusted to approximately 5.7 using dilute aqueous HCl to form a synthetic animal urine.

EXAMPLE 1

Animal Litter

An animal litter is prepared by pelletizing washed, expeller-extracted spent corn germ, a cohesiveness agent, and a supplemental cohesiveness agent in a California Pellet Mill, then crumbling the pellets thus formed to form discrete plural particles of an animal litter.

EXAMPLE 2

Animal Litter

An animal litter was prepared in accordance with Example 1. The animal litter had the following composition:
- 67.5% washed, spent corn germ (expeller-extracted)
- 1.8% sodium chloride
- 16.2% unmodified corn starch
- 14.5% moisture Prior to preparing the litter, the germ was washed in a countercurrent washing process to substantially remove odor components. To prepare the litter, the as-is germ, starch, and sodium chloride were blended simultaneously in a ratio of 78:20:2, moisture-adjusted to 14.5% with the addition of water, and the resulting blend introduced into a California Pellet Mill. The temperature was adjusted to 82° C. by adding steam to the pellet mill. The mixture was extruded through a ⅛ in.×2 in. die at 100 lb./min. to form pellets, which were then crumbled with a pellet mill crumbler to form discrete plural particles having a particle size capable of passing through an 8 mesh screen but retained on a 20-mesh screen.

EXAMPLE 3

Animal Litter

An animal litter was prepared from expeller-extracted spent corn germ (moisture content=1.34% by weight) by grinding the corn germ into particles, and then introducing the ground particles into a California Pellet Mill in the manner set forth above in Example 2. The mixture was then pelletized using a die geometry of ⅛ in.×½ in.

EXAMPLE 4

Animal Litter

An animal litter was prepared in accordance with Example 2. The litter had the following composition (excluding added moisture):
- 80% washed, spent corn germ (expeller-extracted)
- 20% unmodified corn starch.

The following examples illustrate embodiments of the invention wherein the animal litter is made from a grain-based substrate other than corn germ.

COMPARATIVE EXAMPLE 1

An animal litter was prepared from corn grain hulls by grinding the hulls into particles, and then introducing the particles into a California Pellet Mill. The material was pelletized using a die geometry of ⅛ in.×1.0 in. to provide pellets.

COMPARATIVE EXAMPLE 2

An animal litter was prepared from corn grain hulls by mixing the hulls with DURAJEL (R) pregelled starch (A. E. Staley) in a 90:10 ratio (hulls:starch), grinding the mixture into particles, and then introducing the ground particles into a California Pellet Mill. The material was pelletized using a die geometry of ⅛ in.×1.0 in. to provide pellets.

COMPARATIVE EXAMPLE 3

An animal litter was prepared from ground corn cobs and stalks by grinding the cobs and stalks into particles, and then introducing the ground particles into a California Pellet Mill. The material was pelletized using a die geometry of ⅛ in.×1.0 in. to provide pellets.

COMPARATIVE EXAMPLE 4

An animal litter was prepared from corn distillers dried grains by grinding the distillers dried grains into particles, and then introducing the ground particles into a California Pellet Mill. The material was pelletized using a die geometry of ⅛ in.×1.0 in. to provide pellets.

The litters of the foregoing examples were evaluated or density and the following other properties:

Moisture Content

Each litter was assayed using an Ohaus Moisture Balance.

Wettability, Cohesiveness and Apparent Water Sorption Capacity 30.0 g of a litter sample was added to a tarred weigh boat, and the weight was recorded. A burette was filled with de-ionized water, and 4.0 ml of the water was added dropwise to the center of the weighed litter sample. The wettability of the sample was evaluated upon completion of the deionized water addition according to the following criteria:

Excellent: water disappeared within 20 seconds
Fair: water disappeared between 21 and 30 seconds
Poor: water did not disappear within 30 seconds After five minutes of aging, the wetted clump was removed using the tines of a dinner fork and was weighed. The cohesiveness of the wetted clump was evaluated at this point and after aging overnight, using the following criteria:
Excellent: the wetted clump could be removed intact
   Fair: the wetted clump surface was friable, such that some particles remained behind, while the rest of the wetted clump could be removed intact
Poor: the wetted clump broke apart or disintegrated The sorption capacity of the sample was determined according to the following formula.

$$SC = \frac{\text{(weight of water added to sample)}}{\text{(weight of sample)} - \text{(weight of non-wetted sample)}}$$

Tendency to Remain Clumped

A 2000 ml sample of each litter was added to separate 12 in.×20 in. open top plastic bags placed within a cardboard drum approximately 8.25 in. in diameter. Each litter formed a pile having a depth of about 2.0 to 2.5 in. To each bag was added 30 ml of Synthetic Animal Urine. A clump was formed in each bag. The clumps were examined after one minute, after about one to two hours, and after about 48 hours. The clumps were evaluated according to the following criteria:

Excellent: the wetted clump could be removed intact
Fair: the wetted clump surface was friable such that some particles remained behind while the rest of the wetted clump could be removed intact
Poor: the wetted clump broke apart or disintegrated

Ammonia Odor Masking

A synthetic cat urine including 20 ml of a 28% (wt./wt.) aqueous solution of ammonium hydroxide in one liter of deionized water was prepared. 4.0 ml of this synthetic cat urine was added to samples of litter that had been placed in 8-oz. cups with lids. The clumps were allowed to age for about five minutes, and each cup was shaken in order to simulate the covering of a deposit by a cat. A human test panel was used to qualitatively evaluate the samples after about 7 hours.

Fresh Litter Odor

The litters were qualitatively evaluated for litter odor. The following results were obtained:

| Litter | Efficiency (g/150 ml) |
|---|---|
| NATURAL SELECT (a clay-based litter sold by ACC) | 167 g |
| FRESH STEP SCOOP (a clay-based litter sold by Chlorox) | 128 g |
| CAT'S PRIDE (a low-quality clay litter (with galactomannan binder) sold by Oxi Dri Corporation) | 176 g |
| SWHEAT SCOOP (a litter based on ground wheat and other grains sold by Pet Care Systems, Inc.) | 250 g |
| EVERCLEAN (a clay-based litter sold by First Brands) | 150 g |

The litter of Example 2 thus was found to have a substantially higher clumping efficiency than the foregoing commercially available litters. For a household cat that urinates a volume of 150 ml urine per day, a 7 lb. bag of the litter of the invention would last over one month, several days longer than that of the closest competitor and more than twice as long as the competing grain-based litter. The ammonia masking property of the litter of the invention was as good or better than that of each of the commercial litters.

Thus, it is seen that the present invention has overcome the drawbacks of the prior art. The invention provides a clumpable animal litter in the form of discrete plural particles that agglomerate upon wetting to form a clump. The clumpable litter is biodegradable and, in accordance with preferred embodiments of the invention, has a low odor, a high ammonia masking property, and a high clumping efficiency. Moreover, the clumping properties of the animal litter are at least comparable to those of known litters, and the biodegradability of the litter is at least comparable to that of hull-based materials. Spent litter thus may be disposed of by flushing. The litter of the invention remains clumped for at least about 48 hours.

While particular embodiments of the invention have been shown, it will of course be understood that the invention is

PROPERTIES OF ANIMAL LITTER

| Example | Density lbs/cu. ft. | Wettability Rating | Sorption Capacity (ml/g) | Cohesiveness Rating | Clumping Tendency | Clump weight (48 hr.) | Ammonia Masking | Fresh Litter Odor |
|---|---|---|---|---|---|---|---|---|
| 2 | 33.4 | E | 1.25 | E | E | 33.0 | Good | Odorless |
| 3 | 45.2 | E | 0.97 | E–F | E | 34.5 | Good | Grain Feed |
| 4 | 35.7 | E | 0.74 | E | * | * | Good | Odorless |
| Comp. 1 | 38.0 | E | 1.17 | F–P | F | 35.6 | Good | Strong Grain |
| Comp. 2 | 39.1 | E | 0.59 | F–P | F–P | 42.1 | Good | Strong Grain |
| Comp. 3 | 37.0 | E | No Clump | P | Disintegrated | — | Good | Neutral |
| Comp. 4 | 36.1 | E | 0.45 | E–F | E | 61.7 | Good | Strong Feed |

*Not measured

The litter prepared in accordance with Example 2 was evaluated for clumping efficiency. The amount of litter required to clump 150 ml synthetic cat urine was found to be 100 g. The clumping efficiencies of several commercially available brands of cat litter were also evaluated, and the following results were obtained:

not limited thereto since modifications may be made by those skilled in the art, particularly in light of the foregoing teachings. For example, it is contemplated that, in lieu of the grain-based substrates and cohesiveness agents disclosed herein, equivalent components may be substituted therefor in an animal litter or associated process. It is, therefore, contemplated by the appended claims to cover any such modifications as incorporate those features which constitute the essential features of these improvements within the true spirit and scope of the invention.

What is claimed is:

1. An animal litter in the form of discrete plural particles, each of said particles comprising grain germ that is spent of oil, said particles tending to agglomerate when wetted and said litter substantially reducing odors of animal urine.

2. The animal litter of claim 1, said litter tending to remain substantially free of ammonia odors for at least about 30 hours after said litter has been placed into contact with animal urine.

3. The animal litter of claim 1, wherein said grain germ is expeller-extracted corn germ.

4. The animal litter of claim 3, wherein said corn germ is present in said litter in an amount of at least about 45% by weight of said litter.

5. The animal litter of claim 3, wherein said corn germ is present in said litter in an amount of from about 50% to about 85% by weight of said litter.

6. The animal litter of claim 3, wherein said corn germ is present in said litter in an amount of from about 60% to about 75% by weight of said litter.

7. The animal litter of claim 1, wherein said litter has a bulk density of from about 15 to about 45 lbs./cu. ft.

8. The animal litter of claim 1, wherein said litter has a bulk density of from about 25 to about 40 lbs./cu. ft.

9. The animal litter of claim 8, wherein said litter has a bulk density of from about 30 to about 35 lbs./cu. ft.

10. The animal litter of claim 1, wherein said litter has a moisture content of less than about 30% by weight.

11. The animal litter of claim 10, wherein said litter has a moisture content of from about 5% to about 25% by weight of said litter.

12. The animal litter of claim 10, wherein said litter has a moisture content of from about 10% to about 20% by weight of said litter.

13. The animal litter of claim 10, wherein said litter has a moisture content of from about 12% to about 16% by weight of said litter.

14. The animal litter of claim 1, wherein said litter has a sorption capacity of at least about 0.04 ml water/g litter.

15. The animal litter of claim 14, wherein said litter has a sorption capacity of from about 0.04 to about 2.4 ml water/g litter.

16. The animal litter of claim 14, wherein said litter has a sorption capacity of from about 0.6 to about 1.8 ml water/g litter.

17. The animal litter of claim 14, wherein said litter has a sorption capacity of from about 1 to about 1.4 ml water/g litter.

18. The animal litter of claim 1, wherein said grain germ is substantially free of odor components.

19. The animal litter of claim 1, wherein said particles are in the form of compacted granules, each of said granules further comprising a cohesiveness agent in at least an amount effective to enhance the cohesiveness of said granules.

20. The animal litter of claim 19, wherein said compacted granules are in the form of crumbled pelletized particles.

21. The animal litter of claim 19, wherein said cohesiveness agent is present in an amount ranging from about 3% to about 35% by weight of said litter.

22. The animal litter of claim 21, wherein said cohesiveness agent is present in an amount ranging from about 10% to about 25% by weight of said litter.

23. The animal litter of claim 19, wherein said cohesiveness agent comprises a polysaccharide.

24. The animal litter of claim 23, wherein said polysaccharide includes a starch.

25. The animal litter of claim 24, wherein said starch is non-gelatinized starch.

26. The animal litter of claim 25, wherein said starch is corn starch.

27. The animal litter of claim 23, wherein said cohesiveness agent includes said polysaccharide and a supplemental cohesiveness agent.

28. The animal litter of claim 27, wherein said supplemental cohesiveness agent is present in said litter in an amount ranging from about 0.05% to about 10% by weight of said litter.

29. The animal litter of claim 28, wherein said supplemental cohesiveness agent is present in said litter in an amount ranging from about 0.1% to about 8% by weight of said litter.

30. The animal litter of claim 29, wherein said supplemental cohesiveness agent is present in a total amount ranging from about 0.1% to about 6% by weight of said litter.

31. The animal litter of claim 27, wherein said supplemental cohesiveness agent is selected from among the halide, nitrite, carbonate, phosphate, sulfate, and bicarbonate salts of the alkali metals and alkaline-earth metals.

32. The animal litter of claim 31, wherein said supplemental cohesiveness agent is selected from the group consisting of sodium chloride, calcium chloride, sodium carbonate, calcium carbonate, sodium bicarbonate and mixtures thereof.

33. The animal litter of claim 32, wherein said supplemental cohesiveness agent is selected from the group consisting of sodium, chloride, calcium carbonate, and mixtures thereof.

34. The animal litter of claim 1, wherein said animal litter further comprises a mold inhibitor.

35. The animal letter of claim 34, wherein said mold inhibitor is selected from the group consisting of the propionate salts of calcium and sodium.

36. The animal litter of claim 34, wherein said mold inhibitor is present in said litter in an amount ranging from about 0.02% to about 3.5% by weight of said litter.

37. The animal litter of claim 1, wherein said grain germ is solvent-extracted corn germ.

38. The animal litter of claim 1, wherein said grain germ is obtained in a wet milling process.

39. The animal litter of claim 1, wherein said grain germ is obtained in a dry milling process.

40. A process for preparing an animal litter, comprising the steps of:

providing a grain germ that is spent of oil; and compacting said grain germ into discrete plural particles to form an animal litter.

41. The process of claim 40, further comprising a step of adding a mold inhibitor.

42. The process of claim 41, wherein said mold inhibitor is added prior to said compacting step.

43. The process of claim 40, wherein said compacting step comprises pelletizing said grain germ, said process further comprising the step of reducing pellets of animal litter formed in said pelletizing step to a granule size suitable for use as an animal litter.

44. The process of claim 43, wherein said granule size ranges from about 4 mesh to about 400 mesh.

45. The process of claim 44, wherein said granule size ranges from about 8 mesh to about 80 mesh.

46. A process for preparing an animal litter, comprising the steps of:

washing a grain germ with a solvent to substantially remove odor components and flavor components therefrom; and compacting said grain germ into discrete plural granules to form an animal litter.

47. The process of claim 46, wherein said compacting step comprises pelletizing said grain germ, said process further comprising the step of reducing pellets of animal litter formed in said pelletizing step to a granule size suitable for use as an animal litter.

48. The process of claim 46, wherein said solvent is selected from the group consisting of aqueous solvents.

49. The process of claim 48, wherein said solvent is water.

50. The process of claim 48, wherein said solvent includes a compound selected from the group consisting of hydrogen peroxide, ethanol and methanol and blends thereof.

51. An animal litter in the form of discrete plural granules, each of said granules comprising at least about 50% by weight of a grain-based substrate and further comprising a cohesiveness agent in an amount effective to enhance the cohesiveness of said granules, said granules tending to agglomerate when wetted, said cohesiveness agent comprising a polysaccharide, said cohesiveness agent including starch, wherein said starch is non-gelatinized starch.

52. An animal litter consisting essentially of about 50% to about 85% washed, spent grain germ and the balance a cohesiveness agent and moisture, said animal litter being in the form of discrete plural particles which agglomerate when wetted, said grain germ being substantially free of soluble odor components.

53. The animal litter of claim 52, said grain germ consisting essentially of expeller-extracted corn germ.

54. The animal litter of claim 53, wherein said cohesiveness agent comprises a polysaccharide.

55. The animal litter of claim 54, wherein said cohesiveness agent consists essentially of starch.

56. The animal litter of claim 54, wherein said cohesiveness agent includes said polysaccharide and a supplemental cohesiveness agent.

57. The animal litter of claim 56, wherein said supplemental cohesiveness agent is present in said litter in an amount ranging from about 0.05% to about 8% by weight of said litter.

58. The animal litter of claim 57, wherein said supplemental cohesiveness agent is present in said litter in an amount ranging from about 0.1 to about 6% by weight of said litter.

59. The animal litter of claim 58, wherein said supplemental cohesiveness agent is present in a total amount ranging from about 1.5% to about 4% by weight of said litter.

60. The animal litter of claim 56, wherein said supplemental cohesiveness agent is selected from among the halide, nitrate, nitrite, carbonate, phosphate, sulfate, and bicarbonate salts of the alkali metals and alkaline-earth metals.

61. The animal litter of claim 60, wherein said supplemental cohesiveness agent is selected from the group consisting of sodium chloride, sodium carbonate, calcium carbonate, sodium bicarbonate and mixtures thereof.

62. The animal litter of claim 61, wherein said supplemental cohesiveness agent is selected from the group consisting of sodium chloride, calcium carbonate, and mixtures thereof.

63. The animal litter of claim 52, wherein said grain germ is solvent-extracted corn germ.

64. The animal litter of claim 52, wherein said grain germ is obtained in a wet milling process.

65. The animal litter of claim 52, wherein said grain germ is obtained in a dry milling process.

66. An animal litter consisting essentially of at least about 65% washed, spent corn germ, at least about 15% corn starch, at least about 1% sodium chloride, and moisture, said animal litter being in the form of discrete plural particles which agglomerate when wetted.

67. The animal litter of claim 66, wherein said animal litter consists essentially of about 67.5% washed, expeller-extracted corn germ; about 1.8% sodium chloride; about 16.2% unmodified corn starch, and about 14.5% moisture.

68. A process for preparing an animal litter, comprising the steps of:

providing a grain-based substrate;

washing said grain-based substrate to substantially remove odor components therefrom;

providing a cohesiveness agent;

pelletizing said grain-based substrate and said cohesiveness agent to form plural pellets of an animal litter, each of said pellets comprising at least about 50% of said grain-based substrate and an amount of said cohesiveness agent effective to enhance the cohesion of said pellets; and reducing the size of the pellets formed in said pelletizing step to a granule size suitable for use as an animal litter.

69. The process of claim 68, wherein said washing is countercurrent washing.

70. A method for removal of animal waste, comprising:

providing a container containing an animal litter, said animal litter being in the form of discrete plural granules, each of said granules comprising at least about 50% of a grain germ that is spent of oil and an amount of a cohesiveness agent effective to enhance the cohesion of said granules, said granules tending to agglomerate when wetted;

allowing an animal to excrete waste into said container, whereby moisture from said waste causes agglomeration of said animal litter into at least one clump; and removing said clump of litter from said container thereby leaving substantially unspoiled animal litter in said container.

71. The method according to claim 70, wherein said grain-based substrate is a grain germ.

72. The method according to claim 70, wherein said grain-based substrate is expeller-extracted corn germ.

73. The method according to claim 70, wherein said corn germ is present in said litter in an amount ranging from about 50% to about 85% by weight.

74. The method according to claim 73, wherein said corn germ is present in said litter in an amount ranging from about 60% to about 75% by weight.

75. The method according to claim 70, wherein said animal excretes solid waste into said container, said method including the step of removing said solid waste.

76. An animal litter in the form of discrete plural granules, each of said granules comprising at least about 50% by weight of a grain-based substrate and further comprising a cohesiveness agent in an amount effective to enhance the cohesiveness of said granules said granules tending to agglomerate when wetted, wherein said grain-based substrate is solvent-extracted corn germ.

77. An animal litter in the form of discrete plural granules, each of said granules comprising at least about 50% by weight of a grain-based substrate and further comprising a cohesiveness agent in an amount effective to enhance the cohesiveness of said granules, said granules tending to agglomerate when wetted, wherein said grain-based substrate is grain germ obtained in a wet milling process.

* * * * *